United States Patent [19]

Schrock

[11] Patent Number: 5,105,276
[45] Date of Patent: Apr. 14, 1992

[54] DC RESTORATION OF SAMPLED IMAGERY SIGNALS

[75] Inventor: Anthony W. Schrock, Rochester, N.Y.

[73] Assignee: Eastman Kodak Company, Rochester, N.Y.

[21] Appl. No.: 614,794

[22] Filed: Nov. 15, 1990

[51] Int. Cl.$^5$ .......................... H04N 3/14; H04N 5/335
[52] U.S. Cl. ........................ 358/213.16; 358/213.15; 358/171
[58] Field of Search ............ 358/172, 171, 34, 213.16, 358/213.18, 213.15, 221, 173, 167, 36, 358, 341

[56] References Cited

U.S. PATENT DOCUMENTS

| | | | |
|---|---|---|---|
| 3,476,875 | 11/1969 | Davis . | |
| 3,543,169 | 11/1970 | Hill | 328/151 |
| 4,114,179 | 9/1978 | Ilieve | 358/34 |
| 4,274,107 | 6/1981 | Tamura et al. | 358/29 |
| 4,293,877 | 10/1981 | Tsunekawa et al. | 358/213.16 |
| 4,437,120 | 3/1984 | Farmer, Jr. et al. | 358/139 |
| 4,473,846 | 9/1984 | Mackereth | 358/172 |
| 4,562,471 | 12/1985 | Eouzan et al. | 358/172 |
| 4,651,213 | 3/1987 | Takimoto | 358/172 |
| 4,730,210 | 3/1988 | Leshko | 358/34 |
| 4,742,392 | 5/1988 | Hashimoto | 358/172 |
| 4,797,744 | 1/1989 | Klemmer et al. | 358/164 |
| 4,811,101 | 3/1989 | Yagi | 358/171 |

FOREIGN PATENT DOCUMENTS

| | | | |
|---|---|---|---|
| 0037776 | 4/1981 | Japan | 358/213.16 |
| 0171367 | 9/1984 | Japan | 358/172 |

Primary Examiner—James J. Groody
Assistant Examiner—Safet Metjahic

[57] ABSTRACT

The problem of error-introducing artifacts associated with the sampling of the pixels of a solid state imager is obviated by controllably clocking the A-D converter to which the sampled pixel signals are applied, such that the A-D converter digitizes successive pixel samples only during those times that are exclusive of those times when switching transitions occur during the sampling of the imager pixels. The D.C. restoration level is established in accordance with the contents of 'dark' pixel samples, which are exclusive of the switching transitions. In one embodiment, the selective D.C. restoration process is accomplished by coupling the output of the A-D converter to a digital-to-analog (D-A) converter. The D-A converter is clocked during the times that the A-D converter digitizes dark samples, so that it generates successive dark sample-representative voltages. Difference between these analog voltage values and a prescribed level are integrated and fed back to the input to the (A-D) converter as a D.C. restoration offset. In a second embodiment of the invention, the difference between the output of the analog-to-digital converter and a prescribed digital code is used to control the operation of a digital counter. The D.C. reference level is established in accordance with the contents of the digital counter.

30 Claims, 2 Drawing Sheets

DC RESTORATION OF SAMPLED IMAGERY SIGNALS

FIELD OF THE INVENTION

The present invention relates in general to imagery signal processing and is particularly directed to D.C. restoration of a sampled video signal that is free from the influence of switching artifacts that occur during sampling of a matrix of imagery pixels of a solid state imaging device, such as a CCD imager.

BACKGROUND OF THE INVENTION

Video signal processing systems (e.g. a color video camera which performs a raster type scan of its image-sensor area) typically employ a non-light receiving or optically shielded region which, when scanned, provides a 'black' or 'dark' level relative to which the output of the image receiving area of the optical sensor is defined (clamped). FIG. 1 shows, in simplified form, the opto-electronic response across a linear traverse of an optical sensor array, the response characteristic containing a varying signal region 10, and a 'dark' region 12 whereat the sensor elements are shielded from incident light. During each successive blanking portion (the return sweep interval) of the video raster scan signal, the value of the dark region is measured, thereby periodically updating or restoring the D.C. level.

In a solid state imaging system, the behavioral characteristics of the individual devices may dictate that the output of each pixel be sampled, rather than read out via a continuous scan. For example, where the imaging system is comprised of a matrix of charge coupled devices, the light response information component is contained in a charge 'bucket' portion, intermediate reset pulse and reset level portions of its output characteristic. Consequently, as the matrix is scanned, each CCD pixel is sampled only during this charge bucket portion. Unfortunately, the clocking signal that controls the sampling interval introduces artifacts in the output signal, shown diagrammatically in FIG. 2 as switching spikes or pulses 14. These artifacts represent correlated noise that injects an offset error into the black level.

More particularly, as illustrated in FIGS. 3 and 4, which show the effect of varying the gain of a pair of successive dark pixel samples 21 and 22, if a variable gain adjustment of the video signal is employed, it will also vary the magnitude of the sampling artifacts, so that the average value of the black signal, as measured by an associated sample and hold circuit, will vary from its true value, causing the information signal to be erroneously referenced. As shown in FIG. 4, which shows the effect of a gain increase from the signal levels of FIG. 3, the black level drops to a lower level 26' relative to its average level 24. Since the information signal is typically digitized for subsequent processing, what will be sampled and quantized by a downstream analog-to-digital converter (ADC) will yield an output code representative of a level other than a true pixel value.

SUMMARY OF THE INVENTION

In accordance with the present invention, this problem is solved by controllably clocking the A-D converter to which the sampled pixel signals from the matrix of pixels of the solid state imager are applied, such that the A-D converter digitizes successive pixel samples at times that are exclusive of instants in time where switching transitions occur during the sampling of the imager pixels, and by establishing the D.C. restoration (clamp) level in accordance with the contents of 'dark' pixel samples, which contents are exclusive of (or fall between) the switching transitions. In particular, the D.C. restoration level is established in accordance with the difference between the contents of the dark pixel samples and a prescribed (dark) level. Where the solid state imager comprises a matrix or array of charge coupled devices, it may contain a first plurality of light receiving regions, signal samples for which are to be digitized by the A-D converter in accordance with the dark level, and an adjacent second plurality of shielded regions from respective ones of which dark selected signal samples are derived.

In one embodiment of the invention, the selective D.C. restoration process is accomplished by coupling the output of the A-D converter to a digital-to-analog converter (DAC). The DAC is clocked during the times that the A-D converter digitizes dark pixel samples, so that the DAC generates successive dark sample-representative voltages. Differences between these analog voltage values and a prescribed dark current-representative level are integrated and fed back to the input to the (A-D) converter as a D.C. restoration offset.

In a second embodiment of the invention, the difference between the output of the analog-to-digital converter and a prescribed digital code is used to control the operation of a digital counter. The D.C. restoration level is established in accordance with the contents of the digital counter.

DETAILED DESCRIPTION

Figure 1:
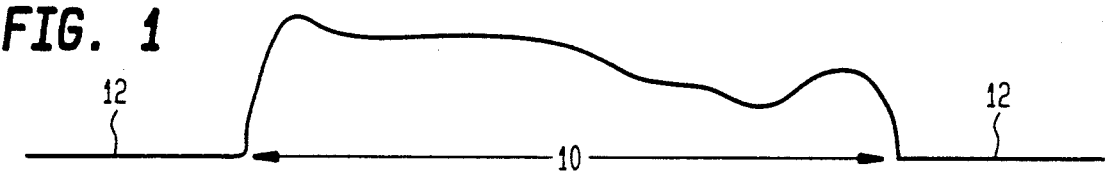
FIG. 1 shows the opto-electronic response across a linear traverse of an optical sensor array, the response characteristic contains a varying information signal region and a 'dark' current region.

Before describing in detail the particular improved mechanism for performing D.C. restoration of sampled imagery signals in accordance with the present invention, it should be observed that the present invention resides primarily in a novel structural combination of conventional signal processing circuits and components and not in the particular detailed configurations thereof. Accordingly, the structure, control and arrangement of these conventional circuits and components have been illustrated in the drawings by readily understandable block diagrams which show only those specific details that are pertinent to the present invention, so as not to obscure the disclosure with structural details which will be readily apparent to those skilled in the art having the benefit of the description herein. Thus, the block diagram illustrations of the Figures do not necessarily represent the mechanical structural arrangement of the exemplary system, but are primarily intended to illustrate the major structural components of the system in a convenient functional grouping, whereby the present invention may be more readily understood.

Figure 5:
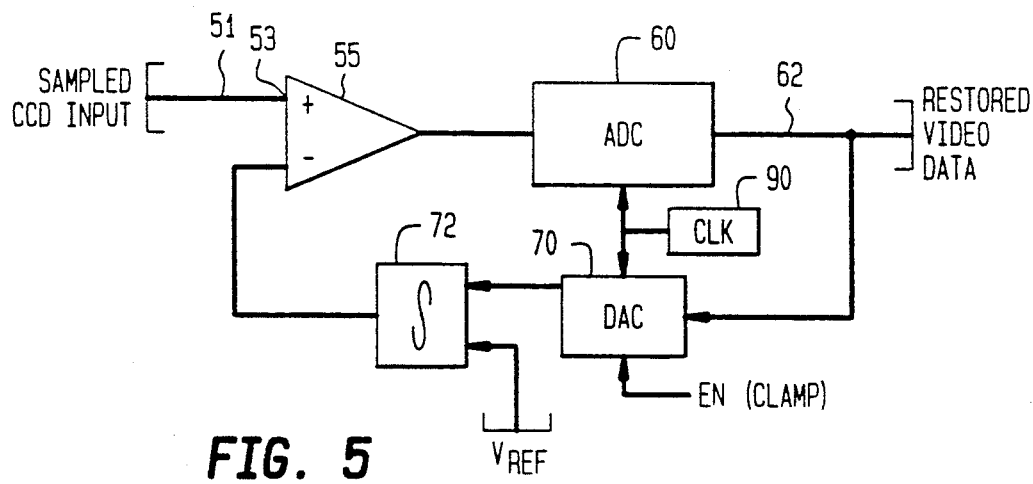
FIG. 5 diagrammatically illustrates a first embodiment of the D.C. restoration mechanism of the present invention incorporated into the signal processing flow path of an analog-to-digital converter through which the sampled output of a solid state CCD image sensor is digitized.
Figure 6:
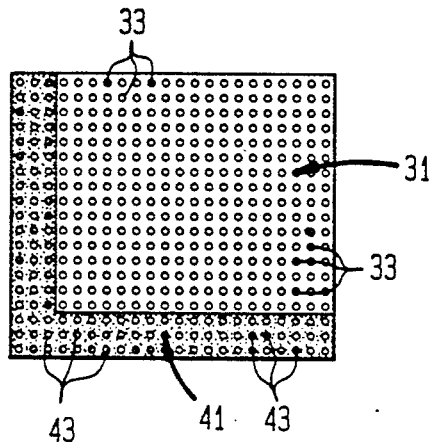
FIG. 6 diagrammatically shows a solid state CCD imager having a two-dimensional pixel array including a light receiving region and an adjacent plurality of shielded 'dark' pixels.

FIG. 5 diagrammatically illustrates a first embodiment of the D.C. restoration mechanism of the present invention incorporated into the signal processing flow path of an analog-to-digital converter through which the sampled output of a solid state image sensor, such as a charge coupled device sensor, is digitized (sampled and quantized to a prescribed encoding resolution (e.g. eight bits) for subsequent imagery signal processing. For purposes of the present description, the solid state imager may comprise a CCD imager having a two-dimensional pixel array, diagrammatically shown in FIG. 6 as including a light receiving region 31 containing a first plurality of light receiving elements or pixels 33, signal samples for which are representative of the contents of an input image and are to be digitally encoded. Adjacent to image receiving region 31 is a second plurality 41 of 'dark' pixels 43, which are shielded and thereby prevented from receiving incident light. The sampled outputs from pixels 43 serve to provide the D.C. restoration level for the A-D converter.

In the D.C. restoration mechanism of the embodiment of FIG. 5, successive analog output samples from the CCD array are coupled over an input link 51 to a first (+) input 53 of a difference amplifier 55, the output of which is coupled to an A-D converter 60. As noted above, the A-D converter digitizes the sampled output of an upstream solid state image sensor, such as a charge coupled device sensor, into a prescribed encoding resolution (e.g. eight bits) for subsequent imagery signal processing. In accordance with the present invention, A-D converter 60 is controllably clocked such that its input signals from the sample and hold circuit used to sample the pixels of the solid state imager are sampled at times that are exclusive of instants in time where switching transitions occur in the input signal, namely between successive switching artifacts in the input signal.

Figure 2:
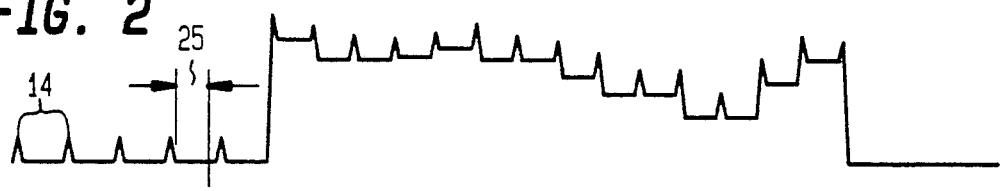
FIG. 2 shows a video output signal containing artifacts diagrammatically shown as switching spikes introduced by the sequential sampling of the respective CCD pixels during each line of a raster scan.
Figure 3:
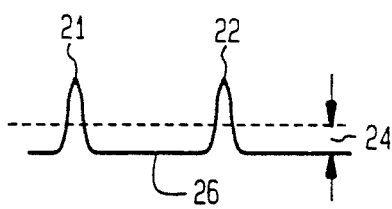
FIGS. 3 and 4 show the effect of varying the gain of a pair of successive dark pixel samples where a variable gain adjustment of the video signal is employed.
Figure 4:
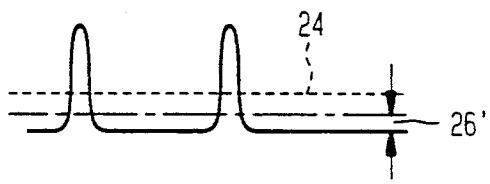

Such sampling times may occur within respective time intervals 25 shown in FIG. 2 as occurring between adjacent sampling artifacts 14 of the input signal on line 51. For this purpose, A-D converter 60 is enabled by the output of a clock source that is referenced to the sample and hold clock through which the respective pixels of the solid state image are sampled. The (eight bit digital code) output of A-D converter 60 is coupled to an output link 62 for delivery to downstream imagery signal processing circuitry (not shown). In addition, in accordance with a first embodiment of the present invention, A-D output code is coupled to a DAC 70 for purposes of controlling the D.C. restoration level to which input signals on line 51 are referenced. DAC 70 is controllably enabled in synchronism with the clocking of A-D converter 60, but only for (clamp) sample times during which dark current samples are being digitized. During sample intervals associated with the scanning of light receiving region 31, DAC 70 is not clocked, so that it holds its most recent value. As a consequence, DAC 70 generates output voltage levels that represent sequential values of sampled dark pixels which are exclusive of or fall between switching artifacts and represent true dark level values required by the D.C. restoration process.

The analog voltage output of DAC 70 is supplied to one input of an integrate-to-zero amplifier 72, a second input of which is coupled to a reference voltage (e.g. ground potential) associated with the intended dark current level. Integrating amplifier 72 integrates the difference between its two inputs and couples the resulting accumulated difference (or error) voltage to a second input 56 of difference amplifier 55. Difference amplifier 55 subtracts the accumulated error voltage (the D.C. restoration clamp value) from the analog input voltage on input line 51, and supplies a 'restored' input to A-D converter 60.

Figure 7:
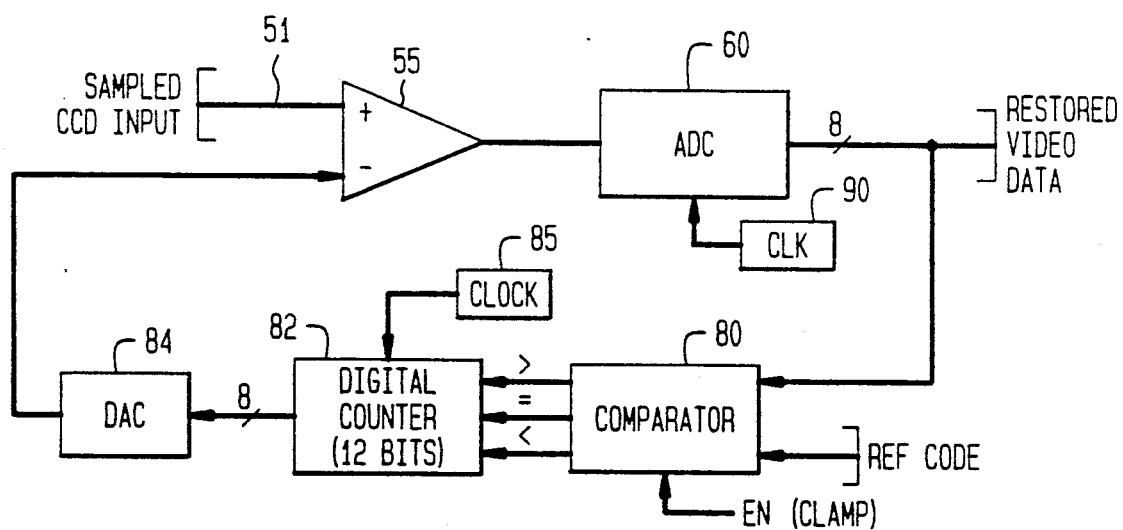
FIG. 7 shows a second embodiment of the invention in which the D.C. restoration level is established in accordance with the contents of the digital counter.

In accordance with a second embodiment of the invention, diagrammatically shown in FIG. 7, the difference between the output of analog-to-digital converter 60 and a prescribed digital code is used to control the operation of a digital counter. The D.C. restoration level is then established in accordance with the contents of the digital counter. For this purpose, the digital output code generated by A-D converter 60 is compared in a comparator 80 with a reference code associated with the intended dark current. As in the case of DAC 70 in the first embodiment, comparator 80 is enabled only during the clamp period, namely during the interval in which the shielded (dark) pixel output samples are digitized by A-D converter 60. The output of comparator 80 is coupled to the count control inputs of a counter 82, which counts clock pulses supplied from a dedicated clock generator 85 and accumulates a running total of the clock pulse count. Depending upon whether or not the output of A-D converter 60 is greater than, the same as, or less than the reference code, the output of comparator 70 will causes counter 82 to be incremented, hold its count or be decremented, respectively. The running total counted by counter 82 is then converted into an analog voltage by a further DAC 84, the output of which is coupled to difference amplifier 55.

In accordance with the second embodiment, the rate at which the D.C. restoration value is updated or modified may be controlled by setting the resolution window of the digital value accumulated in counter 82 and coupled to DAC 84. For example, where counter 82 has a resolution of twelve bits, coupling the upper eight bits to DAC 84 will result in D.C. restoration level being updated every sixteen dark sample values. The rate chosen should be sufficient to provide the required correction without introducing lines into the reproduced video (as would occur at an update for every pixel). Thus the full resolution of counter 82 need not be coupled to D-A converter 84. Instead, some number of most significant bits of the contents of counter 82 may be coupled to D-A converter 84, so that the rate of change of the D.C. restoration voltage can be adjusted.

As will be appreciated from the foregoing description, the present invention solves the problem of error-introducing artifacts associated with the sampling of the pixels of a solid state imager by controllably clocking the A-D converter to which the sampled pixel signals are applied, such that the A-D converter digitizes successive pixel samples only during those times that are exclusive of instants in time where switching transitions occur during the sampling of the imager pixels. By establishing the D.C. restoration level in accordance with the contents of such 'dark' pixel samples which are exclusive of the switching transitions, attributes of the artifacts, including changes resulting from a variable gain control have no effect on the D.C. restoration process, so that input signals will be referenced to a true dark level.

What is claimed:

1. For use with a signal processing apparatus in which successive samples of an input are processed by a signal processing circuit, the operation of which is established in accordance with a reference signal level representative of the contents of selected ones of said successive samples, a method of preventing said reference signal level from being influenced by switching transitions occurring in the course of obtaining successive samples of said input signal, comprising the steps of:

a) enabling said signal processing circuit to process said successive samples at times exclusive of said switching transitions; and b) generating said reference signal level in accordance with the contents of said selected ones of said successive samples, which contents are exclusive of said switching transitions.

2. A method according to claim 1, wherein step (b) comprises generating said reference signal level in accordance with the difference between the contents of said selected ones of said successive samples and a prescribed signal level, the contents of said selected ones of said successive samples being exclusive of said switching transitions.

3. A method according to claim 1, wherein said signal processing circuit comprises an analog-to-digital converter which produces digital codes representative of the values of analog signals processed thereby.

4. A method according to claim 1, wherein said input signal comprises an imagery signal supplied by a solid state imaging device, said solid state imaging device comprising a plurality of light sensitive regions from respective ones of which respective ones of said successive samples are derived.

5. A method according to claim 4, wherein said solid state imaging device comprises a first plurality of light receiving regions, signal samples for which are to be processed by said signal processing circuit in accordance with said reference signal level, and a second plurality of shielded regions from respective ones of which respective ones of said selected signal samples are derived.

6. A method according to claim 3, wherein step (b) comprises coupling the output of said analog-to-digital converter to a digital-to-analog converter and enabling said digital-to-analog converter to convert those digital output codes, produced by said analog-to-digital converter, which are representative of the contents of said selected ones of said successive samples to analog signal levels, and generating said reference signal level in accordance with differences between said analog signal levels and said prescribed signal level.

7. A method according to claim 6, wherein step (b) includes integrating the differences between said analog signal levels and said prescribed signal level and defining said reference signal level in accordance with the integrated difference.

8. For use with an imagery signal processor in which the responses of respective ones of a plurality of image receiving locations of an image receiving device, upon which light from an image source is incident, are sampled and coupled to an analog-to-digital converter for conversion into digital format, the value of a sampled signal input to said analog-to-digital converter being defined relative to a reference signal level, said reference signal level being associated with the response of one or more locations of said image receiving device which are effectively shielded from light from said image source, a method of controlling said reference signal level comprising the steps of:

(a) causing the times at which said analog-to-digital converter digitizes the sampled signal input for conversion into digital format to occur between times at which transitions in the sampling of the responses of said respective ones of a plurality of image receiving locations of said image receiving device occur;

(b) for times at which said analog-to-digital converter digitizes the response of said one or more locations of said image receiving device which are effectively shielded from light from said image source, generating an output signal representative of the difference between the value of the output of said analog-to-digital converter and a prescribed level; and (c) establishing said reference level in accordance with the difference representative output signal generated in step (b).

9. A method according to claim 8, wherein step (c) comprises establishing said reference level in accordance with an average of the difference representative output signal generated in step (b).

10. A method according to claim 8, wherein step (b) comprises, for times at which said analog-to-digital converter digitizes the response of said one or more locations of said image receiving device which are effectively shielded from light from said image source, converting the digital output of said analog-to-digital converter into analog format, and generating an output signal representative of the difference between the output of said analog-to-digital converter and a prescribed level.

11. A method according to claim 10, wherein step (c) comprises establishing said reference level in accordance with an average of the difference representative output signal generated in step (b).

12. A method according to claim 8, wherein step (b) comprises, for times at which said analog-to-digital converter digitizes the response of said one or more locations of said image receiving device which are effectively shielded from light from said image source, and controlling the counting operation of a digital counter in accordance with the difference between the output of said analog-to-digital converter and a prescribed digital code, and wherein step (c) comprises establishing said reference level in accordance with the contents of said digital counter.

13. A method according to claim 12, wherein step (c) comprises converting the contents of said digital counter into an analog signal and establishing said reference level in accordance with said analog signal.

14. For use with an imagery signal processor in which electrical signal responses of respective ones of a plurality of image receiving regions of an image detector, upon which light from an image source is incident, are sampled and coupled to an analog-to-digital converter for conversion into digital format, the digitized value of a sampled signal input to said analog-to-digital converter being defined relative to a reference dark level, said reference dark level being associated with the averaged response of a plurality of regions of said image detector which are effectively shielded from light, a method of controlling said reference dark level comprising the steps of:
  (a) causing the times at which said analog-to-digital converter digitizes the sampled signal input for conversion into digital format to occur between times at which transitions in the sampling of the responses of said respective ones of a plurality of image receiving regions of said image detector occur;
  (b) for times at which said analog-to-digital converter digitizes the response of said one or more regions of said image detector which are effectively shielded from light, generating an output signal representative of the difference between the value of the output of said analog-to-digital converter and a prescribed dark level; and
  (c) establishing said reference dark level in accordance with the difference representative output signal generated in step (b).

15. A method according to claim 14, wherein step (c) comprises establishing said reference dark level in accordance with an average of the difference representative output signal generated in step (b).

16. A method according to claim 14, wherein step (b) comprises, for times at which said analog-to-digital converter digitizes the response of said one or more regions of said image detector which are effectively shielded from light, converting the digital output of said analog-to-digital converter into analog format, and generating an output signal representative of the difference between the output of said analog-to-digital converter and said prescribed dark level.

17. A method according to claim 16, wherein step (c) comprises establishing said reference dark level in accordance with an average of the difference representative output signal generated in step (b).

18. A method according to claim 14, wherein step (b) comprises, for times at which said analog-to-digital converter digitizes the response of said one or more regions of said image detector which are effectively shielded from light, and controlling the counting operation of a digital counter in accordance with the difference between the output of said analog-to-digital converter and a prescribed digital code, and wherein step (c) comprises establishing said reference dark level in accordance with the contents of said digital counter.

19. A method according to claim 18, wherein step (c) comprises converting the contents of said digital counter into an analog signal and establishing said reference dark level in accordance with said analog signal.

20. For use with a signal processing apparatus in which successive samples of an input are processed by a signal processing circuit, the operation of which is established in accordance with a reference signal level representative of the contents of selected ones of said successive samples, an apparatus for preventing said reference signal level from being influenced by switching transitions occurring in the course of obtaining successive samples of said input signal, comprising in combination:
  first means for enabling said signal processing circuit to process said successive samples at times exclusive of said switching transitions; and
  second means, coupled to said first means, for generating said reference signal level in accordance with the contents of said selected ones of said successive samples, which contents are exclusive of said switching transitions.

21. An apparatus according to claim 20, wherein said second means includes means for generating said reference signal level in accordance with the difference between the contents of said selected ones of said successive samples and a prescribed signal level, the contents of said selected ones of said successive samples being exclusive of said switching transitions.

22. An apparatus according to claim 20, wherein said signal processing circuit comprises an analog-to-digital converter which produces digital codes representative of the values of analog signals processed thereby.

23. An apparatus according to claim 20, wherein said input signal comprises an imagery signal supplied by a solid state imaging device, said solid state imaging device comprising a plurality of light sensitive regions from respective ones of which respective ones of said successive samples are derived.

24. An apparatus according to claim 22, wherein said second means comprises means for coupling the output of said analog-to-digital converter to a digital-to-analog converter and enabling said digital-to-analog converter to convert those digital output codes, produced by said analog-to-digital converter, which are representative of the contents of said selected ones of said successive samples to analog signal levels, and means for generating said reference signal level in accordance with differences between said analog signal levels and said prescribed signal level.

25. An apparatus according to claim 24, wherein said second means comprises means for integrating the differences between said analog signal levels and said prescribed signal level and defining said reference signal level in accordance with the integrated difference.

26. For use with an imagery signal processor in which the responses of respective ones of a plurality of image receiving locations of an image receiving device, upon which light from an image source is incident, are sampled and coupled to an analog-to-digital converter for conversion into digital format, the value of a sampled signal input to said analog-to-digital converter being defined relative to a reference signal level, said reference signal level being associated with the response of one or more locations of said image receiving device which are effectively shielded from light from said image source, an apparatus for controlling said reference signal level comprising, in combination:
  first means for causing the times at which said analog-to-digital converter digitizes the sampled signal input for conversion into digital format to occur between times at which transitions in the sampling of the responses of said respective ones of a plurality of image receiving locations of said image receiving device occur;
  second means, coupled to said first means, for generating, at times at which said analog-to-digital converter digitizes the response of said one or more locations of said image receiving device which are effectively shielded from light from said image source, an output signal representative of the difference between the value of the output of said analog-to-digital converter and a prescribed level; and
  third means, coupled to said second means, for establishing said reference level in accordance with the difference representative output signal generated by said second means.

27. An apparatus according to claim 26, wherein said third means comprises means for establishing said reference level in accordance with an average of the difference representative output signal generated by said second means.

28. An apparatus according to claim 26, wherein said second means comprises means, operable at times at which said analog-to-digital converter digitizes the response of said one or more locations of said image receiving device which are effectively shielded from light from said image source, for converting the digital output of said analog-to-digital converter into analog format, and means for generating an output signal representative of the difference between the output of said analog-to-digital converter and a prescribed level.

29. A method according to claim 26, wherein said second means comprises means, operable at times at which said analog-to-digital converter digitizes the response of said one or more locations of said image receiving device which are effectively shielded from light from said image source, for controlling the counting operation of a digital counter in accordance with the difference between the output of said analog-to-digital converter and a prescribed digital code, and wherein said third means comprises means for establishing said reference level in accordance with the contents of said digital counter.

30. An apparatus according to claim 29, wherein said third means comprises means for converting the contents of said digital counter into an analog signal and establishing said reference level in accordance with said analog signal.

* * * * *